United States Patent
Kaufmann

(10) Patent No.: US 6,632,551 B1
(45) Date of Patent: Oct. 14, 2003

(54) FUEL CELL ARRANGEMENT AND GAS SUPPLY SYSTEM AND METHOD FOR OPERATING THE SAME

(75) Inventor: Lars Kaufmann, Dettingen/Teck (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 36 days.

(21) Appl. No.: 09/717,000

(22) Filed: Nov. 22, 2000

(30) Foreign Application Priority Data

Nov. 24, 1999 (DE) .......................... 199 56 376

(51) Int. Cl.$^7$ .............................. H01M 8/00
(52) U.S. Cl. .................. 429/13; 429/19; 429/26
(58) Field of Search ................ 429/13, 17, 20, 429/19, 12, 26

(56) References Cited

U.S. PATENT DOCUMENTS 3,972,731 A    8/1976  Bloomfield et al. ...... 136/86 R
4,128,700 A  * 12/1978  Sederquist ................ 429/17
6,316,134 B1 * 11/2001  Cownden et al. ......... 429/19

* cited by examiner

*Primary Examiner*—Stephen Kalafut
*Assistant Examiner*—R Alejandro
(74) *Attorney, Agent, or Firm*—Crowell & Moring LLP

(57) ABSTRACT

A fuel cell arrangement has at least one fuel cell with an anode and a cathode. A compressor arranged in the admission flow path of the cathode supplies air to the cathode, and a reforming unit with a reformer and a thermally coupled heating chamber is arranged in the admission flow path of the anode supplies the anode with a hydrogen-rich medium. A catalytic burner arranged in the cathode off-gas flow path between cathode and an expansion machine is coupled to drive the compressor. The heating chamber of the reforming unit or of an evaporator unit arranged in the admission flow path of the anode is arranged in the cathode off-gas flow path; and the expansion machine is arranged in the cathode off-gas flow path between catalytic burner and the heating chamber.

10 Claims, 1 Drawing Sheet

FUEL CELL ARRANGEMENT AND GAS SUPPLY SYSTEM AND METHOD FOR OPERATING THE SAME

BACKGROUND AND SUMMARY OF THE INVENTION

This application claims the priority of German patent document 199 56 376.4, filed Nov. 24, 1999, the disclosure of which is expressly incorporated by reference herein.

The present invention relates to a fuel cell arrangement and gas supply system, and to a method for operating the same.

U.S. Pat. No. 3,972,731 discloses a fuel cell system of generic type, in which an air compressor that is coupled to a turbine by way of a common shaft is used to supply air to the fuel cell cathode. A hydrogen-rich reformate, produced by an endothermic reaction in a steam reformer, is passed over the fuel cell anode. The steam reformer is thermally coupled to a catalytic burner. The hot, moist cathode off-gas is heavily cooled in a water separator, dehumidified and then reheated by a catalytic burner arranged in the off-gas line. The heated off-gas drives the turbine coupled to the compressor.

Fuel cell systems usually require a compressor for supplying air to the cathode side. A high system pressure is advantageous both in methanol-powered systems and in systems powered by other fuels, in that it improves the water balance of the system, for example. The increased oxygen partial pressure furthermore increases the efficiency of the fuel cell, while minimizing the pressure losses in the fuel cell system.

However, a higher compressor power input is associated with an increased pressure level, which leads to efficiency losses and to an increase in the size of the fuel cell system for the same service output.

Although an increased off-gas temperature level allows a turbine to be used to recover off-gas energy, the efficiency loss is greater the higher the off-gas temperature, since off-gas heat is also lost.

One object of the present invention, therefore, is to provide a device which permits improved utilization of cathode off-gas heat in a fuel cell system.

This and other objects and advantages are achieved by the method and apparatus according to the invention, in which the heating chamber of a reforming unit and/or an evaporator unit in the anode admission flow path, is situated in the cathode off-gas flow path, and an expansion machine is arranged in the cathode off-gas flow path between a catalytic burner and the heating chamber. The advantage of this configuration is that, on the one hand the considerable thermal energy of the hot off-gas can be utilized for the recuperation, while on the other hand the system can also be operated at high pressure without having to accept efficiency losses or to design components larger than necessary, since the electrical compressor power remains low.

The reforming unit preferably has a reforming chamber heated by a heating chamber (designed as heat exchanger), for performing a reforming reaction. Off-gas from the fuel cell (preferably from at least the cathode), which is heated by the catalytic burner to a high first temperature, is cooled in the heating chamber to a very low temperature. No catalytic burner is needed to support a reforming reaction and/or evaporation on the admission flow side of the anode.

In the catalytic burner the cathode off-gas is preferably heated to a first temperature of between 450° C. and 900° C. and, after cooling by approximately 50° C. to 200° C. in an expansion machine, is then fed to the heating chamber of the reforming and/or evaporator unit, where the medium in the cathode off-gas flow path is cooled through heat exchange to a lower temperature of preferably less than 200° C.

The evaporator unit is preferably designed as hot-gas evaporator.

It is advantageous to use an exhaust turbocharger or a turbo-generator as expansion machine. In this manner, use can be made of the high off-gas temperature on the outlet side of the catalytic burner.

In a further preferred embodiment, a device is provided for metered delivery of combustible material into the catalytic burner, preferably as a function of a desired temperature of the medium in the heating chamber of the reforming and/or evaporator unit. It is of particular advantage in this context to control the delivery of combustible material into the catalytic burner, taking into account data from a control device characteristics map, which includes a temperature drop of the cathode off-gas over the expansion machine.

In a preferred embodiment, off-gas from the anode is fed as combustible material to the cathode off-gas flow path on the admission flow side of the catalytic burner. The anode off-gas and the cathode off-gas are preferably combined and mixed in a mixer.

In a preferred embodiment a relief valve is arranged between expansion machine and reforming and/or evaporator unit. This serves to ensure the safety of the system, so that the reforming and/or evaporator devices are not subjected to inadmissibly high levels of energy from the heat exchanger medium.

The compressor is suitably coupled to the expansion machine either mechanically by way of a common shaft, or electrically.

Other objects, advantages and novel features of the present invention will become apparent from the following detailed description of the invention when considered in conjunction with the accompanying drawings.

DETAILED DESCRIPTION OF THE DRAWINGS

The invention is suited to use in both stationary fuel cell systems and fuel cell systems intended for powering vehicles. The invention is particularly advantageous in fuel cell systems which are usually operated at low temperatures, such as fuel cell systems with polymer electrolyte membranes, especially those in which combustible materials such as methanol are used. In these systems, high temperatures are generally unavailable, or are undesirable on account of the temperature balance.

Figure 2:
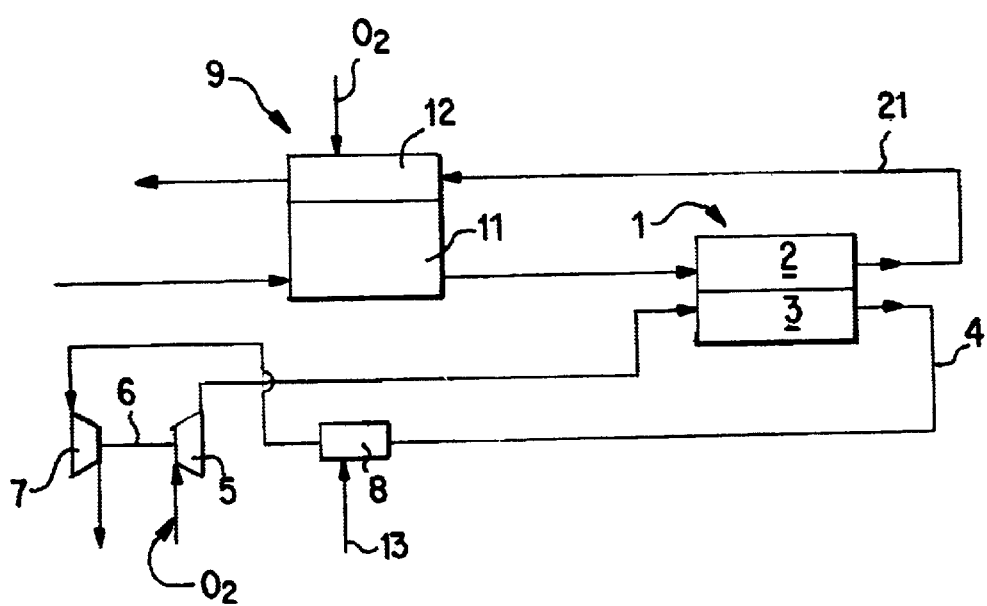
FIG. 2 shows an embodiment of a fuel cell system according to the prior art.

FIG. 2 shows a fuel cell arrangement according to the prior art. A fuel cell 1 has an anode 2 and a cathode 3. The fuel cell is shown in simplified form as a single cell, but may also represent a stack of fuel cells.

A hydrogen-containing medium is passed over the anode 2 by way of a media admission flow path containing a hydrogen-rich reformate from a reforming unit 9 with a reformer 11 and a thermally coupled heating chamber 12, which is formed by a catalytic burner. The off-gas from the anode 2 is fed by way of an anode off-gas flow path 2' to the catalytic burner 12, which also receives a metered air feed for the delivery of $O_2$ as combustible material. From the catalytic burner 12 the anode off-gas may be also introduced into a heat exchanger for water evaporation and/or released into the atmosphere. The heat generated in the catalytic burner 12 supports the endothermic reforming reaction in the reformer 11.

A compressor 5 is arranged in a media admission flow path for the cathode 8 and compresses a medium containing oxygen $O_2$, preferably air, which is fed at high pressure to the cathode 3. The reaction between the medium containing oxygen and the medium containing hydrogen then takes place in the fuel cell. A catalytic burner 8, which burns the cathode off-gas together with additional combustible material and thereby increases the off-gas temperature, is arranged in the cathode off-gas flow path 4. For this purpose a metered supply of combustible material is also delivered to the catalytic burner 8 by way of a metered delivery device 13.

The hot cathode off-gas passes by way of the cathode off-gas flow path 4 into an expansion machine 7. The expansion machine 7 is preferably coupled to the compressor 5, in particular mechanically by way of a common shaft 6. The preferred expansion machine 7 is a turbine and this may drive the compressor 5 by means of the energy recovered from the hot off-gas.

Figure 1:
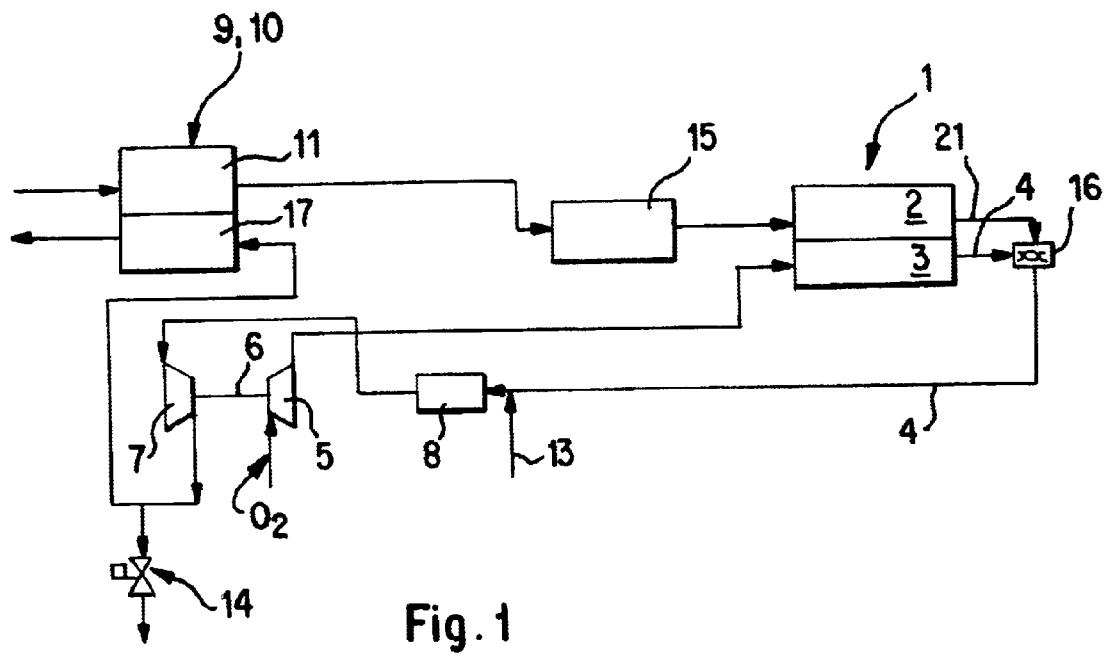
FIG. 1 is a schematic diagram of a preferred embodiment of the invention.

FIG. 1 shows a diagram of a preferred embodiment of the arrangement according to the invention. Identical elements are denoted by the same reference numbers as in FIG. 1.

A hydrogen-rich medium passes into a reformer 11 of a reforming unit 9 and is led by way of an anode admission flow path into a carbon monoxide removal unit 15, where it is cleaned and fed as hydrogen-rich reformate to an anode 2 of a fuel cell 1. The reforming unit 9 has a reformer 11 and a heating chamber 17 thermally coupled thereto.

For the sake of simplicity the fuel cell 1 is represented by a single cell with anode 2 and cathode 3. However, a stack of fuel cells with a plurality of cells may also be provided, which are interconnected in such a way, for example, that their electrical power is sufficient to supply a vehicle electrical system and/or to drive a vehicle.

The cathode 3 is supplied with medium containing oxygen $O_2$ (preferably air) by way of a media admission flow path for the cathode 3. This medium is compressed to a desired pressure level in a compressor 5 (preferably an air compressor) arranged in the media admission flow path, and delivered to the cathode 3. (Preferably the pressure level exceeds approximately 2 bar absolute pressure.) The cathode discharge air is removed from the cathode 3 in a cathode off-gas flow path 4. In a mixer 16 the anode off-gas from the anode off-gas flow path 2' is added to the cathode off-gas in the cathode off-gas flow path 4 and fed to a catalytic burner 8 by way of the cathode off-gas flow path 4. Fuel preferably containing hydrogen may additionally be added to the mixture by way of a metered delivery device 13 on or in the catalytic burner 8. A good fuel is methanol and/or petrol and/or methane.

In flowing through the catalytic burner 8 the cathode off-gas mixture is heated to a first high temperature $T_1$, preferably between 450° C. and 900° C. The hot medium then passes to an expansion machine 7, such as a turbocharger, which drives the compressor 5, preferably by way of a coupling. The compressor 5 may be a single-stage, two-stage or multistage compressor. The coupling is preferably made by way of a common shaft 6 between compressor 5 and expansion machine 7; but the energy recovered from the hot off-gas may also be introduced into the compressor 5 by electrical means, in which case a turbogenerator must be provided. In so doing the off-gas is cooled to a second temperature $T_2$, which is lower than the first temperature $T_1$. The temperature difference $\Delta T$ between first temperature $T_1$ and second temperature $T_2$ preferably is between 50° C. and 200° C.

From the expansion machine 7 the cooled off-gas passes to the reforming unit 9 and flows through the heating chamber 17 of the reforming unit 9. The off-gas energy is used in the heating chamber 17 to support the endothermic reforming reaction in the reformer 12. Instead of the heated reforming unit 9, an evaporator 10 may also be provided, which as a hot gas evaporator utilizes the heat of the off-gas; the off-gas then flows through the heating chamber 17 of the evaporator 10. The temperature of the medium in the heating chamber 17 is heavily cooled to a third temperature $T_3$, preferably less than approximately 200° C. Provision of the heating chamber 17 in the form of a heat exchanger is altogether preferred.

A relief valve 14 is provided in case the temperature of the off-gas on the outlet flow side of the expansion machine 7 is too high. In this case a proportion of the off-gas is blown off upstream of the heating chamber 17.

At elevated off-gas temperature the expansion machine 7 can return a considerable power output back into the system or the compressor 5. Any electrical drive for the compressor 5 may thereby be of smaller design than would otherwise be necessary. Since the off-gas is still at a relatively high temperature on leaving the expansion machine 7, however, this temperature level would mean a large efficiency loss for the system as a whole. By utilizing the still relatively high off-gas temperature $T_2$ available on the outlet side of the expansion machine 7 in a heating chamber 17, functioning as a heat exchanger and situated in the reforming unit and/or evaporator unit 9, 10, the temperature level of the off-gas is, however, reduced yet again, so that the overall efficiency can be improved. The off-gas temperature can be greatly reduced in the heat exchanger 17, to temperatures of less than 100° C., for example. The temperatures $T_3$ are preferably reduced to values of less than 200° C. and in particular to temperatures of less than approximately 150° C.

If the off-gas temperatures $T_1$ in the catalytic burner 8 are greatly increased a situation can arise, depending on the system design, in which the temperature level $T_2$ of the off-gas at the expansion machine 7 is higher than is necessary to operate the reforming unit 9 and/or the evaporator unit 10. It is possible, at full load, to reduce further the necessary compressor power, and thereby to increase the service output. The required fuel cell power (and hence the size of the overall system) can consequently be reduced for the same service output. This has a positive impact on the costs, volume and mass of the fuel cell system.

In the extreme design case the compressor/expansion machine assembly 5, 7 can also achieve generator operation, that is to say the expansion machine 7 generates so much energy that it is possible not only to fully satisfy the demands of compression but also to deliver electrical energy to an electric drive motor of the compressor 5. Since very high off-gas temperatures (for example between 800° C. and 900° C.) are consistent with this extreme design case, a proportion of the off-gas is appropriately blown off via the valve 14 upstream of the heating chamber 17.

It is especially preferable that the off-gas temperature at the heating chamber 17 be controlled or regulated by the metered delivery of combustible material, preferably a fuel (and more especially a medium containing methanol), into the catalytic burner 8.

If the compressor-expansion machine assembly 5, 7 is controlled, the temperature drop of the off-gas over the expansion machine 7 is registered by means of mapping in a data memory, preferably in a control device, and the metering valve 13 is adjusted correspondingly in operation. The mapping preferably indicates the temperature drop as a function of the load and the pressure ratio $\pi$ of the expansion machine 7, where $\pi$ indicates the ratio of the pressure at the expansion machine inlet to the pressure at the expansion machine outlet. Thus in the case of a system at full load and a pressure ratio of $\pi=2.5–3$ for example, this gives a temperature drop of 60° C.–120° C. over the expansion machine 7, depending on its efficiency.

Owing to the high temperatures the conversion in the catalytic burner 8 is very good, despite the metered fuel addition taking place there, so that there is no fear of any significant HC emissions. On the other hand the temperature level is low enough to preclude any nitrogen oxide formation.

The arrangement according to the invention exploits the advantages of systems with a high pressure level on the one hand and a high off-gas temperature on the other, without having to accept their disadvantages such as an enlarged system or an inferior overall efficiency.

It enables the current generating system to be designed with smaller dimensions than in the case of a conventional fuel cell system, since at full load, for example, additional methanol can be converted directly into electrical energy through metered delivery into the catalytic burner 8 and the generation of very high off-gas temperatures.

A system architecture in which a high temperature level prevails at least at one point in the outlet air line of the system is preferably to be selected. The expansion machine 7 is to be appropriately sited at this point and the off-gas cooled downstream thereof. The ensuing pressure losses in the gas flow path should be minimized. The expansion machine 7 is therefore arranged inside the gas generating system of the fuel cell system. An additional silencer component for the expansion machine 7 can be dispensed with, since the heat exchanger 7 fulfils this function.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a fuel cell system having at least one fuel cell, with one of a reforming unit and an evaporating unit for providing fuel to the at least one fuel cell, said at least one fuel cell having an anode side and a cathode side, said method comprising:

supplying at least on off-gas from said cathode side to a catalytic burner;

burning said off-gas in said catalytic burner, thereby heating it to a first temperature;

routing said heated off-gas from said catalytic burner to an expansion machine, where it is cooled to a second, lower temperature; and feeding a gas output from said expansion machine to a heating chamber of said reforming or evaporating unit, where it is cooled to a third temperature, lower than said first and second temperatures.

2. The method according to claim 1, wherein said expansion machine drives a compressor for supplying pressurized reactant gas to said cathode side of said at least one fuel cell.

3. The method according to claim 1, wherein in flowing through the catalytic burner the cathode off-gas is heated to a first temperature between 450° C. and 900° C.

4. The method according to claim 1, wherein in flowing through the expansion machine the cathode off-gas is cooled by a temperature reduction between 50° C. and 200° C.

5. The method according to claim 1, wherein said third temperature is less than 200° C.

6. The method according to claim 1, wherein a metered supply of combustible material is delivered to the catalytic burner for combustion of the cathode off-gas.

7. The method according to claim 6, wherein the metered supply of combustible material into the catalytic burner is delivered as a function of a desired temperature of a medium in the heating chamber of the reforming and/or evaporator unit.

8. The method according to claim 6, wherein one of anode off-gas and fuel is used as combustible material.

9. The method according to claim 6, wherein:

the metered supply of combustible material into the catalytic burner is controlled based on a temperature drop of the cathode off-gas over the expansion machine; and said temperature drop is determined from a characteristics map in a control device, as a function of a pressure ratio of the expansion machine.

10. The method according to claim 1, wherein:

the expansion machine and the compressor interact as a generator utilizing heat supplied by heating of the cathode off-gas in the catalytic burner; and the generator provides electrical energy to an electrical drive of the compressor.

\* \* \* \* \*